Patented Jan. 25, 1927.

1,615,343

UNITED STATES PATENT OFFICE.

FREDRICH OLSEN, OF DOVER, NEW JERSEY, AND HENRY A. AARONSON, OF NEW YORK, N. Y.

TREATMENT OF CELLULOSE.

No Drawing.   Application filed November 9, 1925.  Serial No. 68,029.

This invention relates to the treatment of cellulose and, more particularly to a process or method for controlling the viscosity of solutions of cellulose or cellulose esters.

Broad statements exist in the literature on this subject regarding the low viscosity of nitrated hydrocellulose; hydrocellulose being a term loosely applied to cotton which has been subjected to an acid treatment until the fibers have been very much disintegrated. Hydrocellulose looks and feels like talcum powder by reason of the fineness of its state of subdivision. However, each particle is nothing but a cotton fiber very much reduced in size. Investigation has shown that this product (hydrocellulose) is not as suitable for nitration and subsequent purification of the nitrated product as material which has been subjected to a much less drastic action. The finely divided hydrocellulose invariably clots in the nitrating bath and cannot be nitrated uniformly, nor can stabilization of the resulting product be conveniently carried out, because of the inability of the purification agents, namely, water, or the very dilute acids or alkalies, to penetrate these clotted masses. As a result of this condition the opinion has grown up and is permeating the technical literature that nitrated hydrocellulose is unstable. As a consequence, manufacture of nitrocellulose have taken precautions to exclude hydrocellulose, and the analogous substance cellulose from the cotton which they nitrate.

It is only within the past three years that a real scientific study has been made of the so called hydrocellulose, and the literature of today is full of controversies regarding the nature and characteristics of this material.

A close study of all this recent work has led to the conviction that this term (hydrocellulose) should not be employed because of the misconception which must attend the use of such a designation on account of the properties which tradition has ascribed to this material.

Sometime ago the conclusion was reached that instead of the so-called hydrocellulose, or rather that material which was intermediate in character between the raw cotton and the impalpable powder, which material is commonly known as hydrocellulose, yielding nitrated products of inherent instability, the condition should be just the reverse.

It was further concluded that, if the acid treatment, which produces hydrocellulose, were carefully controlled so that secondary reactions involving decomposition of the cellulose itself were avoided the result would be a marked improvement in the purity of the cotton, and hence in the purity of the nitrocellulose from this cotton.

These conclusions have been verified by numerous experiments. The action of dilute acids (hydrochloric or sulphuric, for example) is two-fold:

(1) It effects a mechanical disintegration of the fiber, producing thereby particles of greatly reduced molecular complexity, even though disintegration be stopped long before the powdery condition is reached.

(2) It hydrolizes the cellulose to various derivatives similar to dextrines, and sugars.

These latter bodies when nitrated are undoubtedly unstable, and in the present process it is endeavored to avoid this hydrolysis by selecting those conditions of temperature, concentration, and time of treatment which will produce the optimum physical disintegration of the fiber with the minimum hydrolysis.

The significance of the breaking down of the cellulose into a product of less molecular complexity is, that the nitrated product has also a much reduced molecular complexity, and hence the particles which are dispersed by the solvent action of acetone, ether, alcohol, ethylacetate, and other solvents, or mixture of solvents are very much smaller, and the resulting viscosity which depends upon the size of these particles is also greatly reduced. This point is of great theoretical and practical importance.

The present investigations indicate that when any of the factors, temperature, concentration, and time of digestion are varied there exists an optimum value for that factor with regard to the viscosity of the resulting product.

In carrying out the process the purification stage would be that customarily employed by manufacturers of cellulose for use in artificial silk, nitrocellulose, or like products. Raw cotton linters or cotton rags can be subjected to the usual purification process which comprises digestion with caustic soda or soda ash, and a bleaching treatment. The cellulose resulting from a treatment such as just outlined is then subjected to the special step or treatment which forms the subject of the present invention.

The cellulose is steeped in an acid bath whose concentration preferably lies between 5 and 10% acidity calculated as HCl or $H_2SO_4$. It is to be understood that a 5% solution means an aqueous solution, 100 grams of which contains 5 grams of hydrogen chloride (HCl) or anhydrous sulfuric acid ($H_2SO_4$). For a dilute solution such as 5 to 10%, this is approximately 52.6 grams of anhydrous hydrogen chloride or sulfuric acid per liter of water in the case of a 5% solution or 111.1 grams per liter in the case of a 10% solution. Either hydrochloric acid or sulphuric acid can be used advantageously, and, although other acids may be used, these are the most desirable from a standpoint of economy. The temperature is maintained during the steeping process preferably between the 40° and 60° C., and the time of steeping is between four hours and twenty-four hours.

Owing to the wide variation in the physical properties of the cellulose which is being treated it may be necessary to depart from the range of concentrations of acid, temperatures, and times of digestion given above, in order to secure optimum effects, although consistently excellent results have been obtained by remaining within these limits on the many samples which have been tested to date. Specifically, the following results have been obtained using cotton linters such as are employed in the preparation of introcellulose or smokeless powder:

With a digestion period of four hours at 55 to 60° C., using 5 parts of a 10% hydrochloric acid solution to one part by weight of cotton, a viscosity of the treated cotton in a 2% cuprammonium solution of 4.7 centipoises, and a viscosity of the material nitrated in the standard pyrocotton process of 0.44 centipoise in a 3% acetone solution was obtained.

These figures are to be compared with those for linters not treated by this special process, but subjected in all respects to the same nitration and other treatments. In other words, pyrocotton prepared in the standard way from regular cotton linters has a viscosity in a 3% acetone solution of 92.9 centipoises, the viscosity of the cotton linters themselves in 2% cuprammonium solution being 920.7 centipoises.

For the purpose of the present application the purification process subsequent to the special treatment above outlined is not significant. It comprises, however, any convenient way of removing the acid which has been introduced into the cotton. This is most simply performed by washing with cold or hot water. However, it is not desired to restrict the scope of the invention by stating that such washing is to be carried out in any particular way because it may be desirable to introduce several treatments subsequent to the step which effects the reduction in viscosity.

Such treatments, for example, might comprise special bleaching treatments or boilings in dilute alkalies to remove various products of acid hydrolysis.

We claim:

1. The process of producing cellulose which comprises steeping the cellulose in an acid bath, heating the bath, and continuing the steeping at a raised temperature until the optimum physical disintegration of the fiber with the minimum hydrolysis has taken place.

2. The process of producing cellulose which comprises steeping the cellulose in an acid bath, heating the bath, and controlling the time of steeping to effect a minimum hydrolysis whereby the viscosity of a solution of the resulting product is brought to a predetermined value.

3. The process of producing cellulose which comprises steeping the cellulose in an acid bath, heating the bath to effect a minimum hydrolysis, and controlling the temperature of the bath to effect a minimum hydrolysis whereby the viscosity of a solution of the resulting product is brought to a predetermined value.

4. The process of producing cellulose which comprises steeping the cellulose in an acid bath, heating the bath to effect a minimum hydrolysis and controlling the concentration of the bath to effect a minimum hydrolysis whereby the viscosity of a solution of the resulting product is brought to a predetermined value.

5. The process of treating cellulose which comprises steeping cellulose in an acid bath whose concentration lies between 5 and 10% acidity calculated for HCl or $H_2SO_4$, maintaining the temperature of the bath between 40° and 60° C. during steeping, and the steeping continuing until the optimum disintegration with a minimum hydrolysis has taken place.

6. The process of treating cellulose which comprises steeping cellulose in an acid bath whose concentration is a given percent from 5 to 10% acidity calculated for HCl or $H_2SO_4$, maintaining the temperature of the bath at a given degree from 40° to 60° C. during steeping, and continuing the steeping for that period of time from four to twenty-four hours which produces the desired disintegration of the cellulose.

7. The process of treating cellulose which comprises steeping cellulose in an acid bath whose concentration lies at a given percent from 5 to 10% acidity calculated for HCl or $H_2SO_4$, continuing the steeping for a given period of time from four to twenty-four hours, and maintaining the temperature of the bath during the steeping at that degree from 40° to 60° C. which produces the desired disintegration of the cellulose.

8. The process of treating cellulose which comprises steeping cellulose for a fixed period of time between four and twenty-four hours, at a given degree of temperature between 40° and 60° C., in an acid bath, the concentration of which lies at that percent between 5 and 10% acidity calculated for HCl or $H_2SO_4$ which produces the desired disintegration of the cellulose.

9. A new cellulose product the viscosity of whose 2% cuprammonium solution is not greater than 15 centipoises.

FREDRICH OLSEN.
HENRY A. AARONSON.